United States Patent
Henderson et al.

(10) Patent No.: US 12,522,067 B2
(45) Date of Patent: Jan. 13, 2026

(54) WHEEL SLIP BOOST FUNCTION FOR A HEAVY-DUTY VEHICLE

(71) Applicant: VOLVO TRUCK CORPORATION, Gothenburg (SE)

(72) Inventors: Leon Henderson, Härryda (SE); Ramadan Salif, Gothenburg (SE); Nikhil Baliga, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/936,131

(22) Filed: Sep. 28, 2022

(65) Prior Publication Data

US 2023/0120062 A1     Apr. 20, 2023

(30) Foreign Application Priority Data

Oct. 18, 2021   (EP) ..................................... 21203148

(51) Int. Cl.
| | |
|---|---|
| *B60T 8/17* | (2006.01) |
| *B60T 8/172* | (2006.01) |
| *B60T 8/175* | (2006.01) |
| *B60T 8/1755* | (2006.01) |

(Continued)

(52) U.S. Cl.
CPC ............ *B60T 8/1708* (2013.01); *B60T 8/172* (2013.01); *B60T 8/175* (2013.01);
(Continued)

(58) Field of Classification Search
None
See application file for complete search history.

(56) References Cited

U.S. PATENT DOCUMENTS

| | | | | |
|---|---|---|---|---|
| 5,530,617 A | * | 6/1996 | Bonavia | F02P 7/035 361/253 |
| 2009/0107748 A1 | | 4/2009 | Luehrsen et al. | |

(Continued)

FOREIGN PATENT DOCUMENTS

| | | | | |
|---|---|---|---|---|
| DE | 102018005614 A1 | * | 1/2019 | ............... B60T 8/172 |
| EP | 0755821 A2 | | 1/1997 | |

(Continued)

OTHER PUBLICATIONS

Max Karjalainen, A method of controlling a powertrain, control arrangement for controlling a powertrain, drivetrain, vehicle, computer program and computer readable medium, Jan. 24, 2019 (Year: 2019).*

(Continued)

*Primary Examiner* — James M Mcpherson
*Assistant Examiner* — Bakari Underwood
(74) *Attorney, Agent, or Firm* — Jeffri A. Kaminski; Venable LLP

(57) ABSTRACT

A computer implemented method for controlling at least one driven and/or braked wheel of a heavy-duty vehicle. The method includes obtaining a motion request indicative of a desired longitudinal acceleration and/or longitudinal force associated with the vehicle, and configuring a wheel slip limit value indicative of a maximum allowable wheel slip by the at least one driven and/or braked wheel at a nominal value, and increasing the wheel slip limit value from the nominal value to a boost wheel slip value in response to detecting a boost signal, as well as controlling the at least one driven and/or braked wheel in dependence of the motion request and subject to the wheel slip limit value.

18 Claims, 4 Drawing Sheets

(51) Int. Cl.
*B60T 8/1761* (2006.01)
*B60W 10/04* (2006.01)
*B60W 10/18* (2012.01)
*B60W 30/18* (2012.01)

(52) U.S. Cl.
CPC ...... *B60T 8/17552* (2013.01); *B60T 8/17616* (2013.01); *B60W 10/04* (2013.01); *B60W 10/18* (2013.01); *B60W 30/18172* (2013.01); *B60T 2220/04* (2013.01); *B60T 2230/02* (2013.01); *B60T 2240/06* (2013.01); *B60W 2300/125* (2013.01); *B60W 2520/26* (2013.01); *B60W 2540/103* (2013.01); *B60W 2540/12* (2013.01)

(56) References Cited

U.S. PATENT DOCUMENTS

2013/0030601 A1* 1/2013 Yoon .................... B60W 10/08 701/1
2015/0329093 A1* 11/2015 Svensson ............. B60T 8/1766 701/74
2019/0176784 A1* 6/2019 Laine .................... B60T 8/172
2021/0078582 A1 3/2021 Murase

FOREIGN PATENT DOCUMENTS

| EP | 3398825 A1 | 11/2018 |
| WO | 2013186208 A2 | 12/2013 |
| WO | 2017215751 A1 | 12/2017 |
| WO | 2021144010 A1 | 7/2021 |

OTHER PUBLICATIONS

Extended European Search Report in corresponding European Application No. 21203148.8 dated Apr. 20, 2022 (5 pages).

Hans Pacejka; "Tyre and vehicle dynamics"; Elsevier Ltd. 2012, ISBN 978-0-08-097016-5 (621 pages).

European Communication under Rule 71(3) EPC dated Dec. 15, 2023 in corresponding European Patent Application No. 21203148.8, 8 pages.

* cited by examiner

WHEEL SLIP BOOST FUNCTION FOR A HEAVY-DUTY VEHICLE

TECHNICAL FIELD

The present disclosure relates to methods and control units for ensuring safe and efficient vehicle motion management of a heavy-duty vehicle. The methods are particularly suitable for use with cargo transporting vehicles, such as trucks and semi-trailers. The invention can however also be applied in other types of heavy-duty vehicles, e.g., in construction equipment and in mining vehicles, as well as in cars.

BACKGROUND

Heavy-duty vehicles have traditionally been controlled using torque request signals determined based on the position of an accelerator or brake pedal and sent to motion support devices (MSDs) such as service brakes and propulsion devices over digital interfaces. However, advantages may be obtained by instead controlling the actuators using wheel slip or wheel speed requests sent from a central vehicle controller to the different actuators. This moves the actuator control closer to the wheel end, and therefore allows for a reduced latency and a faster more accurate control of the MSDs. Wheel-slip based MSD control approaches are particularly suitable for use with wheel-end electrical machines in a battery or fuel cell powered vehicle, which can be accurately controlled at high bandwidth. Wheel-slip based vehicle motion management and its associated advantages are discussed in, e.g., WO 2017/215751 and in WO 2021/144010.

Wheel slip or wheel speed-based control of heavy-duty vehicles often relies on an approximated relationship between wheel slip and generated longitudinal wheel force, often referred to as an inverse tyre model. However, a heavy-duty vehicle is a complex dynamic mechanical system that is difficult to model accurately and that may quickly change behavior in response to e.g., a change in road friction conditions. Thus, the inverse tyre model may not always be totally accurate, which can lead to reduced performance.

There is a desire for vehicle motion management methods which are more resilient to errors in the approximated relationship between wheel slip and generated longitudinal wheel force.

SUMMARY

It is an object of the present disclosure to at least partially overcome the above-described deficiencies, and to provide improved methods for controlling a heavy-duty vehicle. The object is obtained by a computer implemented method for controlling at least one driven and/or braked wheel of a heavy-duty vehicle. The method comprises obtaining a motion request indicative of a desired longitudinal acceleration associated with the vehicle and/or a longitudinal force which it is desired to generate by one or more of the wheels. The method also comprises configuring a wheel slip limit value at a nominal wheel slip limit value in dependence of an inverse tyre model, wherein the inverse tyre model represents a relationship between wheel slip and wheel force at the wheel and wherein the wheel slip limit value is indicative of a maximum allowable wheel slip by the at least one driven and/or braked wheel. The method furthermore comprises increasing a magnitude of the configured wheel slip limit value from the nominal wheel slip limit value to a boost wheel slip limit value in response to detecting a boost signal and controlling the at least one driven and/or braked wheel in dependence of the motion request and subject to the configured wheel slip limit value. This way the allowable wheel slip can be temporarily increased by generation of the boost signal. The feature may come in handy, e.g., when driving uphill in difficult conditions or in other scenarios where a driver, a remote controller, or an autonomous drive algorithm determines that a wheel slip beyond the nominal wheel slip limit value is desired, giving an extra boost. It is a particular advantage that the wheel slip limit is configured in dependence of the inverse tyre model, since this connects the wheel slip limit to the obtainable longitudinal force possible to generate by a wheel on the vehicle. By means of the disclosed method, a vehicle motion management method which is more resilient to errors in the approximated relationship between wheel slip and generated longitudinal wheel force is provided.

According to aspects, the method comprises determining the nominal wheel slip limit value based on an inverse tyre model, wherein the inverse tyre model is representative of a relationship between wheel slip and wheel force of the at least one driven and/or braked wheel. The inverse tyre model is a convenient means for translating between a desired longitudinal force to be generated by a given wheel, and the corresponding wheel slip. The nominal wheel slip limit value may, e.g., be determined as a point some margin away from the peak of the inverse tyre model, i.e., the wheel slip corresponding to maximum longitudinal force. Since the inverse tyre model can be determined in dependence of the current operating conditions of the vehicle, the wheel slip limit will also be adjusted in accordance with the operating conditions of the vehicle, which is an advantage.

The motion request may, e.g., be obtained as function of an accelerator pedal position or a brake pedal position, thus allowing a driver to engage the boost mode in a convenient manner by depressing the pedal by a significant amount, e.g., in excess of some predetermined threshold value. It is appreciated that the method may be most useful in connection to acceleration, i.e., forward propulsion, although it may also find important uses in connection to retardation, i.e., during hard braking.

Alternatively, or as a complement to pedal position triggering of the boost mode, the motion request may be obtained from a motion support device (MSD) coordination function of a vehicle motion management (VMM) system comprised in the heavy-duty vehicle as will be discussed in more detail below, and/or from an autonomous or semi-autonomous drive function comprised in the vehicle. This means that the vehicle control functions will have the option of temporarily increasing wheel slip in order to obtain a boost, at least temporarily, e.g., in case it is believed that a too conservative slip limit is in place. This increases the control freedom of an autonomous or semi-autonomous control algorithm, which is an advantage.

The method optionally also comprises determining a target wheel slip value as a nominal target wheel slip value in dependence of the motion request and also in dependence of an inverse tyre model representing a relationship between wheel slip and longitudinal wheel force. The method then comprises increasing the target wheel slip value from the nominal target wheel slip value to a boost target wheel slip value in response to detecting the boost signal and controlling the at least one driven and/or braked wheel in dependence of the target wheel slip value. Thus, in addition to increasing the wheel slip limit value, the target wheel slip used for vehicle control can be temporarily increased in order to provide a boost to vehicle propulsion. The feature may be used with advantage, e.g., in driving scenarios where the nominal target wheel slip value is too conservative for some reason.

The boost signal may, e.g., be triggered when an accelerator pedal position or brake pedal position exceeds a threshold value. The boost signal may also be manually triggered by operation of a trigger device, such as an in-cabin button, switch, or the like. The boost signal may also be triggered by an accelerator pedal position or brake pedal position exceeding a threshold value for a pre-determined time period.

In order to not jeopardize vehicle stability, the boost signal is optionally conditioned on that the vehicle is operating at a velocity below a vehicle velocity acceptance threshold. Thus, no boost signal will be generated if the vehicle is moving too fast. Generation of the boost signal may also be conditioned on that the vehicle is operating at a yaw motion below a vehicle yaw motion acceptance threshold. This means that the method can be configured such that no boost mode is allowed if the vehicle is cornering, since this could jeopardize successful completion of the turning maneuver. The reason being that the ability to generate lateral force is reduced when longitudinal wheel slip increases. In a similar manner, the method may of course also comprise determining a lateral force requirement of the at least driven and/or braked wheel, wherein the boost signal is then conditioned on that the lateral force requirement is below a lateral force requirement threshold. This way vehicle stability and safety are not jeopardized by the increase in wheel slip. Otherwise, a sudden increase in longitudinal wheel slip may reduce lateral force generation capability down to dangerously low values.

The method may also comprise increasing the configured wheel slip limit value from the nominal wheel slip limit value to the boost wheel slip limit value only during a pre-determined time period. After this time period, the wheel slip limit settings may, e.g., revert back to the nominal value or to some other interim value. This may prevent the wheels of the vehicle from digging into the road surface, which of course is an advantage.

According to aspects, the boost signal is arranged to be remotely triggered by operation of a remote-control trigger device. This allows an operator or autonomous function external to the vehicle to trigger the boost mode, e.g., to allow the vehicle to negotiate a difficult hill or the like. This way additional functionality may be granted to the vehicle by a remote authority, which could be an advantage in some situations, e.g., in confined areas where autonomous vehicles are otherwise required to operate at rather conservative wheel slip values in order to ensure safe operation. The remote authority may temporarily allow the autonomous of semi-autonomous vehicle to operate at a higher wheel slip value, in order to temporarily increase the maneuverability of the vehicle.

The method may also comprise updating an inverse tyre model associated with the at least one driven and/or braked wheel in response to detecting the boost signal. This means that the inverse tyre model used for managing vehicle motion will be refined over time, leading to a more accurate inverse tyre model, which is an advantage.

The object may also be obtained by a computer implemented method for controlling at least one driven and/or braked wheel of a heavy-duty vehicle. The method comprises obtaining a motion request indicative of a desired longitudinal force to be generated by one or more wheels on the vehicle, configuring a nominal relationship between wheel slip and longitudinal force, i.e., an inverse tyre model or the like, where the relationship is at least partly based on a slip stiffness value. The method further comprises obtaining a driver input signal indicative of a desired adjustment of the nominal slip stiffness value, reconfiguring the nominal relationship between wheel slip and longitudinal force to account for the adjustment of the nominal slip stiffness value, and controlling the at least one driven and/or braked wheel in dependence of the motion request and based on the adjusted relationship between wheel slip and longitudinal force.

Thus, the driver input signal, which may be the boost signal discussed above, is used to adjust the properties of the perceived vehicle dynamics. An effect similar to the boost mode discussed above may be obtained in this manner, by adjusting the relationship between wheel slip and longitudinal force. A similar method may be considered where instead or as a complement the assumed peak longitudinal force of the inverse tyre model is shifted in response to a driver input signal.

The adjustment to the inverse tyre model can of course be made a function of the time the driver depresses the pedal, i.e., the longer the pedal is depressed, the more the slip stiffness in the model changes. The other features discussed above are of course also applicable for this type of adjustment of the inverse tyre model There is also disclosed herein control units, vehicle units, computer programs, computer readable media, and computer program products associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

The above, as well as additional objects, features and advantages, will be better understood through the following illustrative and non-limiting detailed description of exemplary embodiments, wherein.

DETAILED DESCRIPTION

Figure 1:
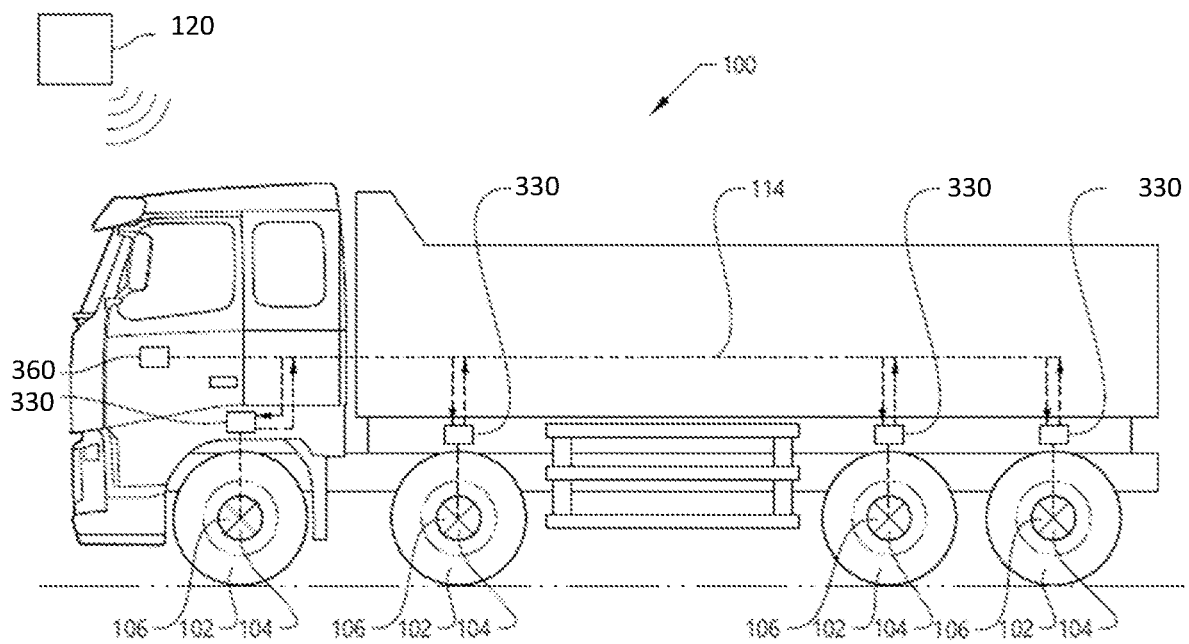
FIG. 1 illustrates an example heavy-duty vehicle.

The present disclosure will now be described more fully hereinafter with reference to the accompanying drawings, in which exemplary embodiments are shown. The disclosure may, however, be embodied in many different forms and should not be construed as limited to the embodiments set forth herein; rather, these embodiments are provided for thoroughness and completeness. Like reference character refer to like elements throughout the description.

FIG. 1 illustrates an example heavy-duty vehicle 100, here in the form of a truck. The vehicle comprises a plurality of wheels 102, wherein at least a subset of the wheels 102 comprises a respective motion support device (MSD) 104. Although the embodiment depicted in FIG. 1 illustrates an MSD for each of the wheels 102, it should be readily understood that e.g., one pair of wheels 102 may be arranged without such an MSD 104. Also, an MSD may be arranged connected to more than one wheel, e.g., via a differential arrangement.

It is appreciated that the herein disclosed methods and control units can be applied with advantage also in other types of heavy-duty vehicles, such as trucks with drawbar connections, construction equipment, buses, and the like. The vehicle 100 may also comprise more than two vehicle units, i.e., a dolly vehicle unit may be used to tow more than one trailer.

The MSDs 104 may be arranged for generating a torque on a respective wheel of the vehicle or for both wheels of an axle. The MSD may be a propulsion device, such as an electric machine 106 arranged to e.g., provide a longitudinal wheel force to the wheel(s) of the vehicle 100. Such an electric machine may thus be adapted to generate a propulsion torque as well as to be arranged in a regenerative braking mode for electrically charging a battery (not shown) or other energy storage system(s) of the vehicle 100. Electric machines may also generate braking torque without storing energy. For instance, brake resistors and the like may be used to dissipate the excess energy from the electric machines during braking.

The MSDs 104 may also comprise friction brakes such as disc brakes or drum brakes arranged to generate a braking torque by the wheel 102 in order to decelerate the vehicle. Herein, the term acceleration is to be construed broadly to encompass both positive acceleration (propulsion) and negative acceleration (braking).

The methods disclosed herein primarily relate to controlling propulsion of heavy-duty vehicles, i.e., acceleration. However, the disclosed methods may also find use in decelerating heavy-duty vehicles, i.e., during braking maneuvers.

Moreover, each of the MSDs 104 is connected to a respective MSD control system 330 arranged for controlling operation of the MSD 104. The MSD control system 330 is preferably a decentralized motion support system 330, although centralized implementations are also possible. It is furthermore appreciated that some parts of the MSD control system may be implemented on processing circuitry remote from the vehicle, such as on a remote server 120 accessible from the vehicle via wireless link. Still further, each MSD control system 330 is connected to a vehicle motion management (VMM) system or function 360 of the vehicle 100 via a data bus communication arrangement 114 that can be either wired, wireless or both wired and wireless. Hereby, control signals can be transmitted between the vehicle motion management system 360 and the MSD control system 330. The vehicle motion management system 360 and the MSD control system 330 will be described in further detail below with reference to FIG. 3 and FIG. 5.

The VMM system 360 as well as the MSD control system 330 may include a microprocessor, microcontroller, programmable digital signal processor or another programmable device. The systems may also, or instead, include an application specific integrated circuit, a programmable gate array or programmable array logic, a programmable logic device, or a digital signal processor. Where the system(s) include(s) a programmable device such as the microprocessor, microcontroller or programmable digital signal processor mentioned above, the processor may further include computer executable code that controls operation of the programmable device. Implementation aspects of the different vehicle unit processing circuits will be discussed in more detail below in connection to FIG. 7.

Generally, the MSDs on the vehicle 100 may also be realized as, e.g., a power steering device, active suspension, and the like. Although these types of MSDs cannot be used to directly generate longitudinal force, they are still part of the overall vehicle motion management of the heavy-duty vehicle and may therefore form part of the herein disclosed methods for vehicle motion management.

Notably, the MSDs of the heavy-duty vehicle 100 are often coordinated in order to obtain a desired motion by the vehicle. For instance, two or more MSDs may be used jointly to generate a desired propulsion torque or braking torque, a desired yaw motion by the vehicle, or some other dynamic behavior.

Figure 2:
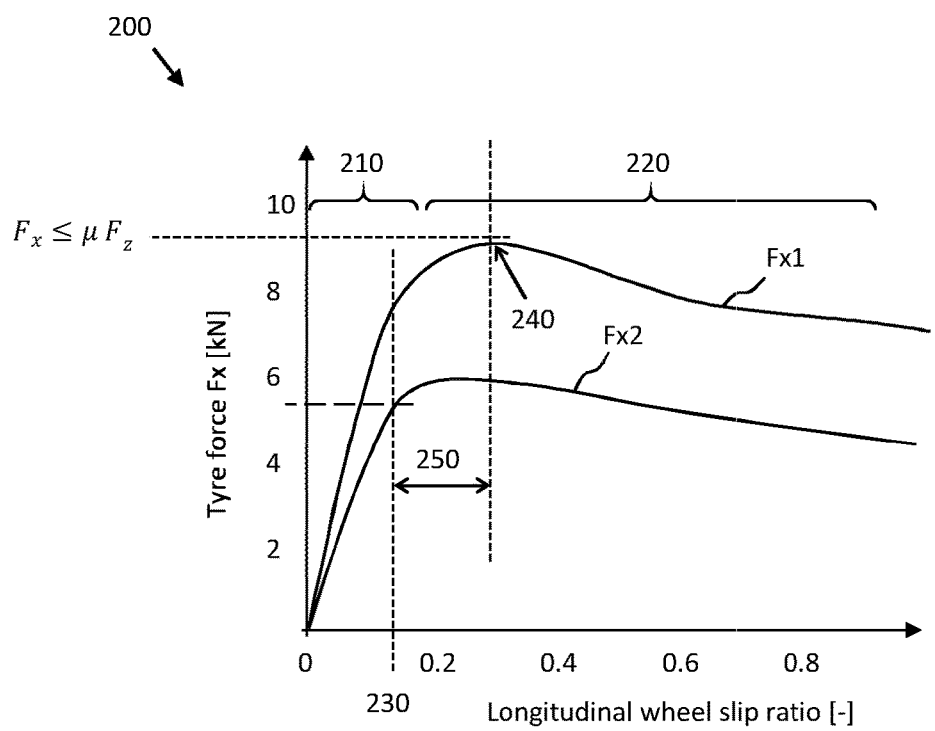
FIG. 2 is a graph showing example tyre forces as function of wheel slip.

FIG. 2 is a graph showing an example 200 of achievable tyre force as function of longitudinal wheel slip. Longitudinal wheel slip $\lambda_x$ may, in accordance with SAE J370 (SAE Vehicle Dynamics Standards Committee Jan. 24, 2008) be defined as $$\lambda_x = \frac{R\omega_x - v_x}{\max(|R\omega_x|, |v_x|)}$$

where R is an effective wheel radius in meters, $\omega_x$ is the angular velocity of the wheel, and $v_x$ is the longitudinal speed of the wheel (in the coordinate system of the wheel). Thus, $\lambda_x$ is bounded between −1 and 1 and quantifies how much the wheel is slipping with respect to the road surface. Wheel slip is, in essence, a speed difference measured between the wheel and the vehicle. Thus, the herein disclosed techniques can be adapted for use with any type of wheel slip definition. It is also appreciated that a wheel slip value is equivalent to a wheel speed value given a velocity of the wheel over the surface, in the coordinate system of the wheel. The VMM 360 and optionally also the MSD control system 330 optionally maintains information on $v_x$ (in the reference frame of the wheel), while a wheel speed sensor or the like can be used to determine $\omega_x$ (the rotational velocity of the wheel).

In order for a wheel (or tyre) to produce a wheel force, slip must occur. For smaller slip values the relationship between slip and generated force are approximately linear, where the proportionality constant is often denoted as the slip stiffness of the tyre. A tyre is subject to a longitudinal force $F_x$, a lateral force $F_y$, and a normal force $F_z$. The normal force $F_z$ is key to determining some important vehicle properties. For instance, the normal force to a large extent determines the achievable lateral tyre force $F_y$ by the wheel since, normally, $F_x \le \mu F_z$, where $\mu$ is a friction coefficient associated with a road friction condition. The maximum available lateral force for a given lateral slip can be described by the so-called Magic Formula as described in "Tyre and vehicle dynamics", Elsevier Ltd. 2012, ISBN 978-0-08-097016-5, by Hans Pacejka.

An inverse tyre model can be used to translate between a desired longitudinal tyre force $F_x$ and wheel slip. The interface between VMM and MSDs capable of delivering steering and optionally also torque to the vehicle's wheels has as mentioned above traditionally been focused on torque-based requests to each MSD from the VMM without any consideration towards wheel slip. However, this approach has significant performance limitations. In case a safety critical or excessive slip situation arises, then a relevant safety function (traction control, anti-lock brakes, etc.) operated on a separate control unit normally steps in and requests a torque override in order to bring the slip back into control. The problem with this approach is that since the primary control of the actuator and the slip control of the actuator are allocated to different electronic control units (ECUs), the latencies involved in the communication between them significantly limits the slip control performance. Moreover, the related actuator and slip assumptions made in the two ECUs that are used to achieve the actual slip control can be inconsistent and this in turn can lead to sub-optimal performance. Significant benefits can be achieved by instead using a wheel speed or wheel slip-based request on the interface between VMM 360 and the MSD controller or controllers 330, thereby shifting the difficult actuator speed control loop to the MSD controllers, which generally operate with a much shorter sample time compared to that of the VMM function. Such an architecture can provide much better disturbance rejection compared to a torque-based control interface and thus improves the predictability of the forces generated at the tyre road contact patch.

Referring again to FIG. 2, the longitudinal tyre force Fx1, Fx2 shows an almost linearly increasing part 210 for small wheel slips, followed by a part 220 with more non-linear behavior for larger wheel slips. The tyre model Fx1 is representative of a high friction scenario, i.e., dry road with good tyres, while Fx2 is representative of a reduced friction scenario. Note that the maximum achievable tyre force drops with the friction coefficient $\mu$. Note also that the wheel slip value corresponding to the peak wheel force shifts a bit between the two curves, where the peak 240 of the curve Fx1 occurs for a higher wheel slip compared to the peak 260 for the curve Fx2. Hence, a wheel slip limit $\lambda_{lim}$ configured some margin away from the peak of the curve Fx2 may be overly conservative if in fact the curve Fx1 is closer to the actual relationship between wheel slip and wheel force.

With reference to the curve Fx2, it is desirable to maintain vehicle operation in the linear region 210, where the obtainable longitudinal force in response to an applied brake command is easier to predict, and where enough lateral tyre force can be generated if needed. To ensure operation in this region, a wheel slip limit $\lambda_{lim}$ 230 on the order of, e.g., 0.1, can be imposed on a given wheel. For larger wheel slips, e.g., exceeding 0.1, a more non-linear region 220 is seen. Control of a vehicle in this region may be difficult and is therefore often avoided. It may be interesting for traction in off-road conditions and the like where a larger slip limit for traction control might be preferred, but not for on-road operation.

It is an advantage to configure the wheel slip limit in dependence of an inverse tyre model, and not as a predetermined or hardcoded parameter. A wheel slip limit configured relative to, e.g., the peak value of an assumed inverse tyre model will be matched to the current operating conditions of the vehicle.

However, it may still be desired to override a slip limit which has been configured based on an assumed inverse tyre model. For instance, the inverse tyre model may inadvertently be too conservative, meaning that the full potential traction or braking force by the vehicle is not available since the slip limit prevents operation at the desired wheel slips.

For instance, suppose that the heavy-duty vehicle motion management uses an inverse tyre model according to the curve Fx2, while in reality the curve Fx1 more accurately models the true relationship between wheel slip and longitudinal wheel force. Suppose further that a wheel slip limit has been configured at 230 in order to ensure operation in the linear region 210. With this slip limit, the vehicle will not be able to generate more wheel force than about 5.5 kN, which is way below the maximum achievable wheel force of about 9 kN. This is of course undesirous.

To allow a driver or some other form of vehicle controller, such as an autonomous or semi-autonomous drive system, to override a configured nominal wheel slip limit value, it is proposed herein to allow for a temporary increase of the wheel slip limit value to a boost wheel slip limit value in response to detecting a boost signal, which boost signal may, e.g., be triggered by a driver depressing an acceleration or brake pedal beyond a certain threshold value, or by a driver operating some in-cabin manual control, like a boost button on the dashboard. For certain vehicles and use cases, that include both autonomous and human-centered driving modes, it may be desirable to be able to give a human driver more control authority than an automated driver, the techniques disclosed herein may be used to provide such an increased level of control over the allowable wheel slip.

The boost signal mechanism may also be used by some remote authority, like a control tower, to allow some vehicles to operate at higher slip values temporarily, e.g., when it is desired that such high wheel slip operation may be advantageous and deemed safe.

Also, if the inverse tyre model is updated in real time, based on observed vehicle behavior, then it can be beneficial that in some situations the wheel slip is allowed to go beyond the peak of the current 'known' tyre model. When the vehicle is being driven by a human driver the accelerator pedal can be used to 'force' a higher slip target in certain situations, and (for example) gain some additional traction performance if the current tyre model parametrization is overly conservative. This way the vehicle controller may "probe" the relationship between wheel force and wheel slip also beyond the configured nominal wheel slip limit, at least temporarily.

For some functional safety argumentation, adding this type of wheel slip limit "override" may reduce the number of functional safety requirements placed on the inverse tyre model, as here the human driver can always override to a higher slip target in critical situations (e.g., stuck on a train track and trying to take off).

Figure 3:
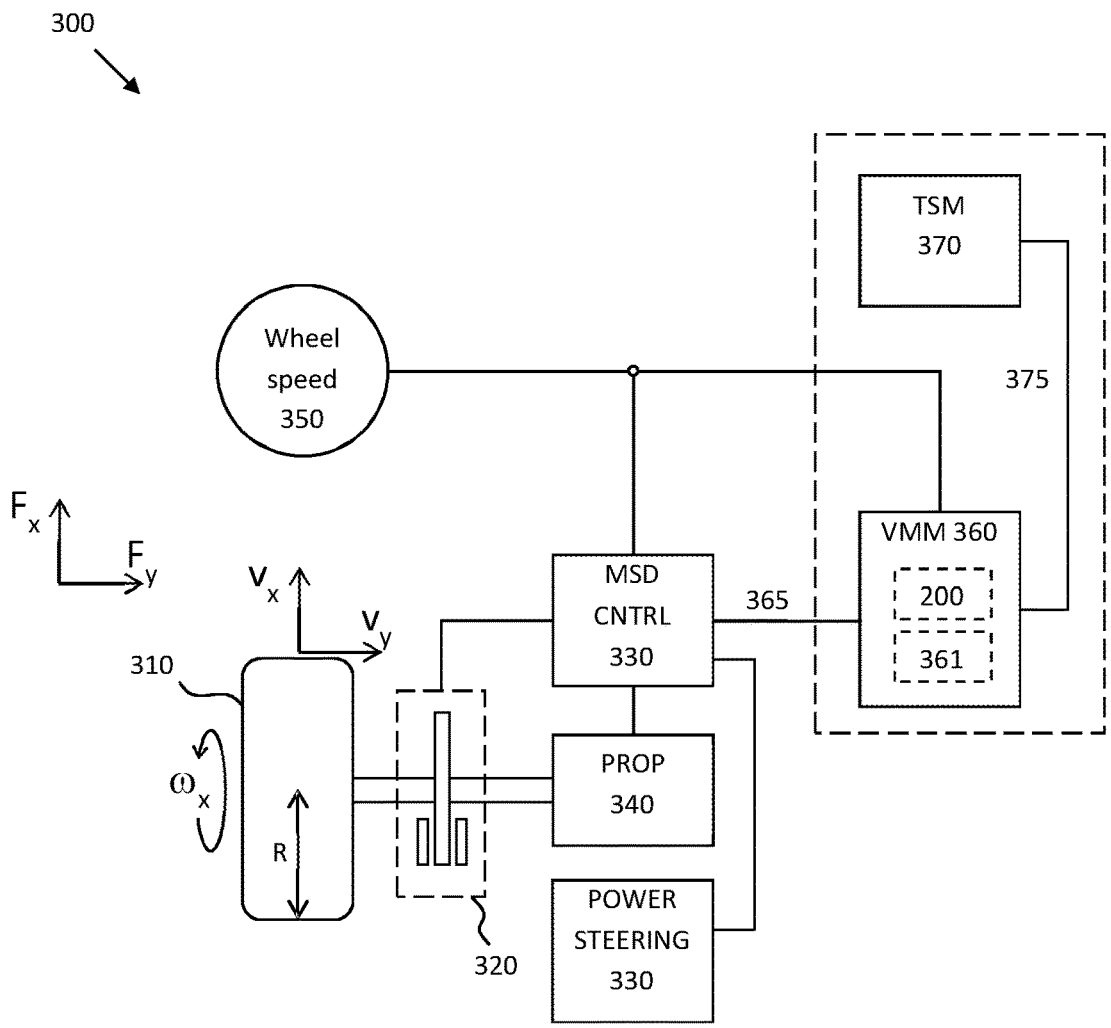
FIG. 3 shows an example motion support device control arrangement.

Turning now to FIG. 3, the overall vehicle control system 300 may be implemented on one or more vehicle unit computers (VUC). The VUC may be configured to execute vehicle control methods which are organized according to a layered functional architecture where some functionality may be comprised in a traffic situation management (TSM) domain 370 in a higher layer and some other functionality may be comprised in a vehicle motion management (VMM) domain 360 residing in a lower functional layer.

FIG. 3 schematically illustrates functionality 300 for controlling an example wheel 310 on the vehicle 100 by some example MSDs here comprising a friction brake 320 (such as a disc brake or a drum brake), a propulsion device 340 and a steering arrangement 330. The friction brake 320 and the propulsion device are examples of wheel torque generating devices, which can be controlled by one or more motion support device control units 330. The control is based on, e.g., measurement data obtained from a wheel speed sensor 350 and from other vehicle state sensors 370, such as radar sensors, lidar sensors, and also vision based sensors such as camera sensors and infra-red detectors. An MSD control system 330 may be arranged to control one or more actuators. For instance, it is not uncommon that an MSD control system 330 is arranged to control both wheels on an axle.

The TSM function 370 plans driving operation with a time horizon of 10 seconds or so. This time frame corresponds to, e.g., the time it takes for the vehicle 100 to negotiate a curve or the like. The vehicle maneuvers, planned and executed by the TSM function, can be associated with acceleration profiles and curvature profiles which describe a desired target vehicle velocity in the vehicle forward direction and turning to be maintained for a given maneuver. The TSM function continuously requests the desired acceleration profiles $a_{req}$ and steering angles (or curvature profiles $c_{req}$) from the VMM function 360 which performs force allocation to meet the requests from the TSM function in a safe and robust manner. The VMM function 360 operates on a timescale of below one second or so and will be discussed in more detail below.

The wheel 310 has a longitudinal velocity component $v_x$ and a lateral velocity component $v_y$. There is a longitudinal wheel force $F_x$ and a lateral wheel force $F_y$, and also a normal force $F_z$ acting on the wheel (not shown in FIG. 3). Unless explicitly stated otherwise, the wheel forces are defined in the coordinate system of the wheel, i.e., the longitudinal force is directed in the rolling plane of the wheel, while the lateral wheel force is directed normal to the rolling plane of the wheel. The wheel has a rotational velocity $w_x$, and a radius R.

The type of tyre model 200 shown in FIG. 2 can be used by the VMM 360 to generate a desired tyre force at some wheel. Instead of requesting a torque corresponding to the desired tyre force, the VMM can translate the desired tyre force into an equivalent wheel slip (or, equivalently, a wheel speed relative to a speed over ground) and request this slip instead. The main advantage being that the MSD control device 330 will be able to deliver the requested torque with much higher bandwidth by maintaining operation at the desired wheel slip, using the vehicle speed $v_x$ and the wheel rotational velocity $\omega_x$, obtained, e.g., from the wheel speed sensor 350. The vehicle speed $v_x$ can be obtained from various vehicle sensors such as radar, lidar, and vision-based sensor in combination with a global positioning system (GPS) receiver and the like.

The control unit or units can be arranged to store a pre-determined inverse tyre model $f^{-1}$ in memory, e.g., as a look-up table. The inverse tyre model is arranged to be stored in the memory as a function of the current operating condition of the wheel 310. This means that the behavior of the inverse tyre model is adjusted in dependence of the operating condition of the vehicle, which means that a more accurate model is obtained compared to one which does not account for operating condition. The model which is stored in memory can be determined based on experiments and trials, or based on analytical derivation, or a combination of the two. For instance, the control unit can be configured to access a set of different models which are selected depending on the current operating conditions. One inverse tyre model can be tailored for high load driving, where normal forces are large, another inverse tyre model can be tailored for slippery road conditions where road friction is low, and so on. The selection of a model to use can be based on a pre-determined set of selection rules. The model stored in memory can also, at least partly, be a function of operating condition. Thus, the model may be configured to take, e.g., normal force or road friction as input parameters, thereby obtaining the inverse tyre model in dependence of a current operating condition of the wheel 310. It is appreciated that many aspects of the operating conditions can be approximated by default operating condition parameters, while other aspects of the operating conditions can be roughly classified into a smaller number of classes. Thus, obtaining the inverse tyre model in dependence of a current operating condition of the wheel 310 does not necessarily mean that a large number of different models need to be stored, or a complicated analytical function which is able to account for variation in operating condition with fine granularity. Rather, it may be enough with two or three different models which are selected depending on operating condition. For instance, one model to be used when the vehicle is heavily loaded and another model to be used otherwise. In all cases, the mapping between tyre force and wheel slip changes in some way in dependence of the operating condition, which improves the precision of the mapping.

The inverse tyre model may also be implemented at least partly as an adaptive model configured to automatically or at least semi-automatically adapt to the current operating conditions of the vehicle. This can be achieved by constantly monitoring the response of a given wheel in terms of wheel force generated in response to a given wheel slip request, and/or monitoring the response of the vehicle 100 in response to the wheel slip requests. The adaptive model can then be adjusted to more accurately model the wheel forces obtained in response to a given wheel slip request from a wheel.

Inverse tyre models can be automatically configured from the remote server 120, e.g., as software updates, or manually by a technician performing vehicle routine servicing.

Suppose that the TSM function 370 sends a motion request 375 over the interface between TSM and VMM, e.g., as function of an acceleration pedal position or as a control decision made by some autonomous drive algorithm operating in a higher layer control function. The VMM function performs vehicle control based on the principles discussed above, i.e., ensuring operation in the linear force region 210 and avoiding excessive wheel slip by configuring a wheel slip limit value $\lambda_{lim}$ at a nominal wheel slip limit value. This wheel slip limit value is then indicative of a maximum allowable wheel slip by one or more of the wheels 102 on the vehicle, as discussed above. The VMM module 360 also comprises a wheel slip boost module 361, which is configured to increase a magnitude of the configured wheel slip limit value $\lambda_{lim}$ from the nominal wheel slip limit value to a boost wheel slip limit value in response to detecting a boost signal 361. This means that the positive propulsion wheel slip limit becomes larger while the negative braking wheel slip limit becomes smaller (more negative).

Thus, the VMM system and the MSD controller is at least temporarily allowed to control the wheel at a wheel slip beyond the nominal wheel slip limit. For instance, in case the inverse tyre model used by the VMM function is the Fx2 function in FIG. 2, while the Fx1 function is in fact closer to the true relationship, then the boost mode allows the vehicle to approach the peak force 240, at least during a limited period of time. The optimal offset 250 from the nominal wheel slip limit to the peak force wheel slip limit may be difficult to determine exactly. However, by allowing for a boost in the configured wheel slip limit, the achievable wheel force may be increased at least to some extent. Consequently, a driver wanting to negotiate an up-hill road with difficult road friction conditions, would be allowed to temporarily increase wheel slip beyond the nominal wheel slip limit in order to see if this provides more longitudinal wheel force. The function is similar in nature to the type of "step-down" or "kick-down" acceleration boost mode that exist in many personal cars today.

The magnitude amount by which nominal wheel slip limit value is increased may be configured at some fixed value, say a wheel slip increase of about 0.05. Alternatively, the magnitude increase amount may be configurable by the driver. The system may also comprise a gradual increase of the wheel slip limit. For instance, when the driver depresses the acceleration or brake pedal beyond some threshold value, then the wheel slip limit is increased by some default preconfigured amount. The amount of increase beyond the nominal wheel slip limit can then be increased, e.g., linearly, as a function of how far beyond the threshold the pedal is depressed.

Figure 4:
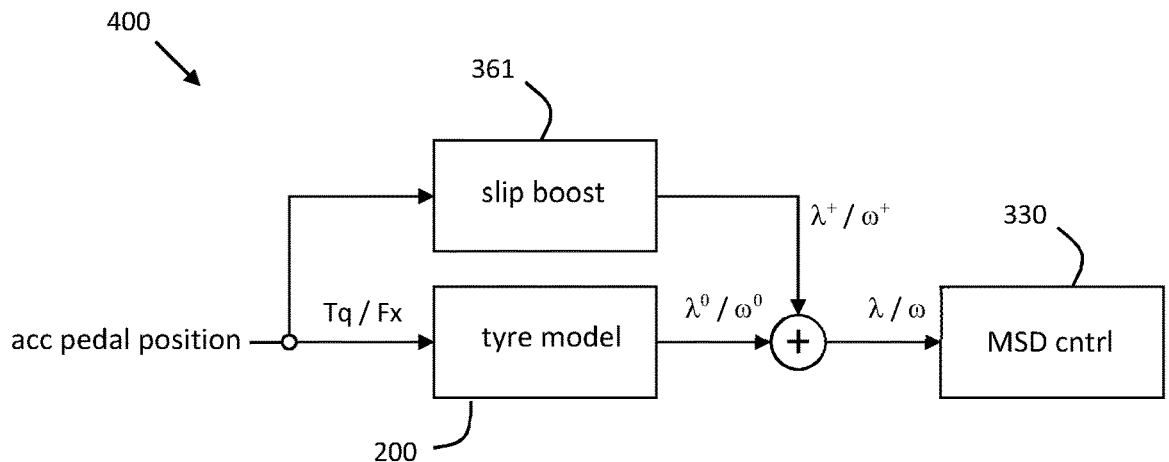
FIG. 4 illustrates an example arrangement for wheel slip boosting.

FIG. 4 illustrates an example arrangement 400 for wheel slip boosting according to the principles discussed above. In this example, an accelerator pedal position (can also be a brake pedal position) is mapped to a torque request Tq or a wheel force request $F_x$ for generating a desired acceleration of the vehicle 100. This desired wheel force is mapped to a desired nominal wheel slip value $\lambda^0$ or, equivalently, to a wheel speed value $\omega^0$. A boost signal is triggered by monitoring the pedal position and generating the boost signal in case the pedal position is depressed by more than a predetermined amount, say between 50% and 80%, or all the way. If the driver depresses the pedal enough to trigger the boost signal, a magnitude of the configured wheel slip limit value is increased from the nominal wheel slip limit value to a boost wheel slip limit value. The increased wheel slip value (or the equivalent wheel speed value) is then sent to the MSD controller 330 for controlling the wheel.

Figure 5:
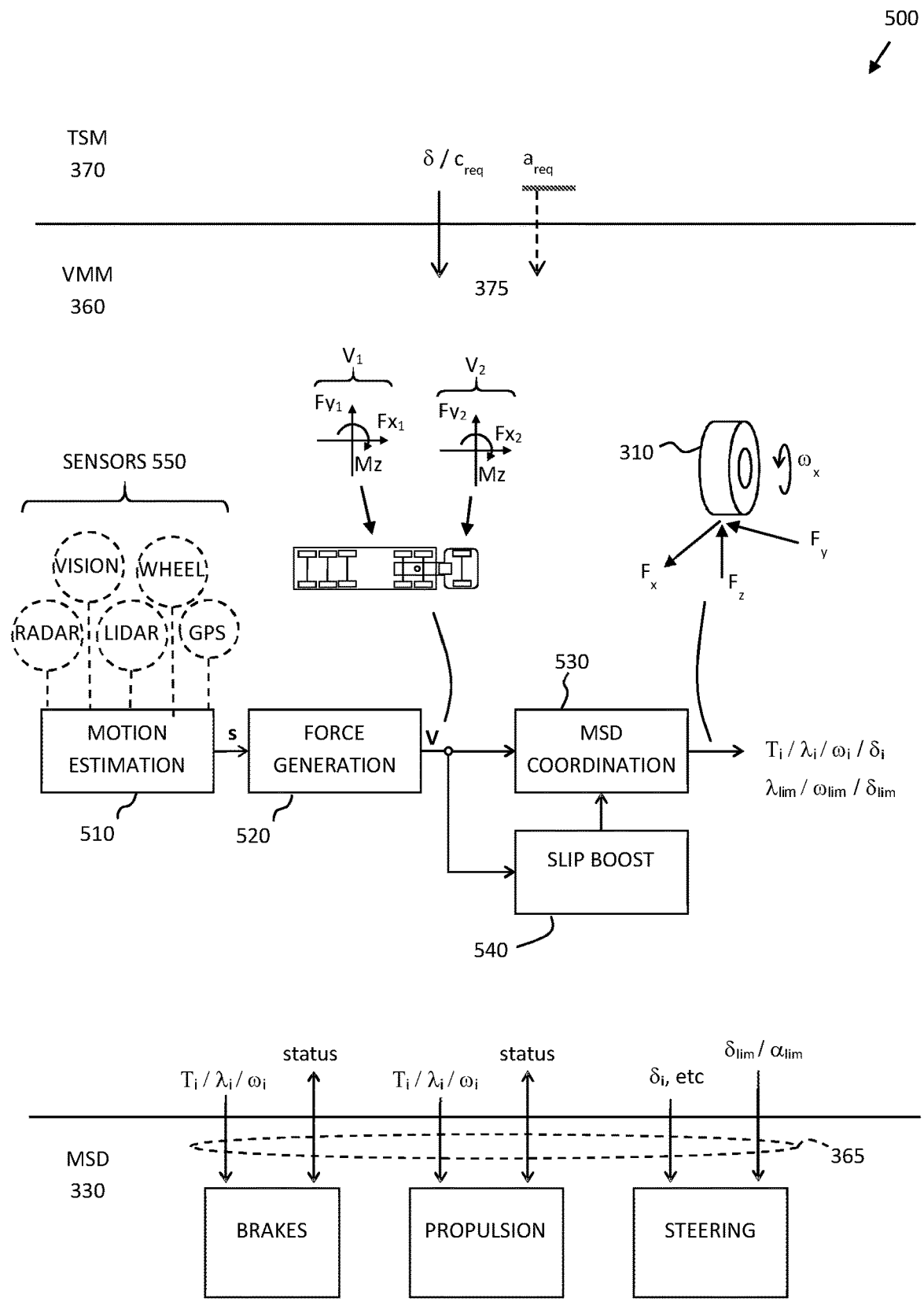
FIG. 5 illustrates an example vehicle control function architecture.

FIG. 5 illustrates an example vehicle control function architecture applicable with the herein disclosed methods, where the TSM function 370 generates vehicle motion requests 375, which may comprise a desired steering angle δ or an equivalent curvature $c_{req}$ to be followed by the vehicle, and which may also comprise desired vehicle unit accelerations $a_{req}$ and also other types of vehicle motion requests, which together describe a desired motion by the vehicle along a desired path at a desired velocity profile. It is understood that the motion requests can be used as base for determining or predicting a required amount of longitudinal and lateral forces which needs to be generated in order to successfully complete a maneuver.

The VMM function 360 operates with a time horizon of about 1 second or so, and continuously transforms the acceleration profiles $a_{req}$ and curvature profiles $c_{req}$ from the TSM function into control commands for controlling vehicle motion functions, actuated by the different MSDs of the vehicle 100 which report back capabilities to the VMM, which in turn are used as constraints in the vehicle control. The VMM function 360 performs vehicle state or motion estimation 510, i.e., the VMM function 360 continuously determines a vehicle state s comprising positions, speeds, accelerations, and articulation angles of the different units in the vehicle combination by monitoring operations using various sensors arranged on the vehicle 100, often but not always in connection to the MSDs.

The result of the motion estimation 510, i.e., the estimated vehicle state s, is input to a force generation module 520 which determines the required global forces $V=[V_1, V_2]$ for the different vehicle units to cause the vehicle 100 to move according to the requested acceleration and curvature profiles $a_{req}$, $c_{req}$, and to behave according to the desired vehicle behavior. The required global force vector V is input to an MSD coordination function 530 which allocates wheel forces and coordinates other MSDs such as steering and suspension. The MSD coordination function outputs an MSD control allocation for the i:th wheel, which may comprise any of a torque $T_i$, a longitudinal wheel slip $\lambda_i$, a wheel rotational speed $\omega_i$, and/or a wheel steering angle $\delta_i$. The coordinated MSDs then together provide the desired lateral $F_y$ and longitudinal Fx forces on the vehicle units, as well as the required moments Mz, to obtain the desired motion by the vehicle combination 100.

By determining vehicle unit motion using, e.g., global positioning systems, vision-based sensors, wheel speed sensors, radar sensors, steering angle sensors and/or lidar sensors, and translating this vehicle unit motion into a local coordinate system of a given wheel 310 (in terms of, e.g., longitudinal and lateral velocity components), it becomes possible to accurately estimate wheel slip in real time by comparing the vehicle unit motion in the wheel reference coordinate system to data obtained from the wheel speed sensor 350 arranged in connection to the wheel 310, as discussed above. A tyre model, which was discussed above in connection to FIG. 2, can be used to translate between a desired longitudinal tyre force $Fx_i$ for a given wheel i and an equivalent longitudinal wheel slip A for the wheel.

Thus, according to some aspects of the present disclosure, the VMM function 360 manages both force generation and MSD coordination, i.e., it determines what forces that are required at the vehicle units in order to fulfil the requests from the TSM function 370, for instance to accelerate the vehicle according to a requested acceleration profile requested by TSM and/or to generate a certain curvature motion by the vehicle also requested by TSM. The forces may comprise e.g., yaw moments Mz, longitudinal forces Fx and lateral forces Fy, as well as different types of torques to be applied at different wheels. The forces are determined such as to generate the vehicle behavior which is expected by the TSM function in response to the control inputs generated by the TSM function 370.

Figure 6:
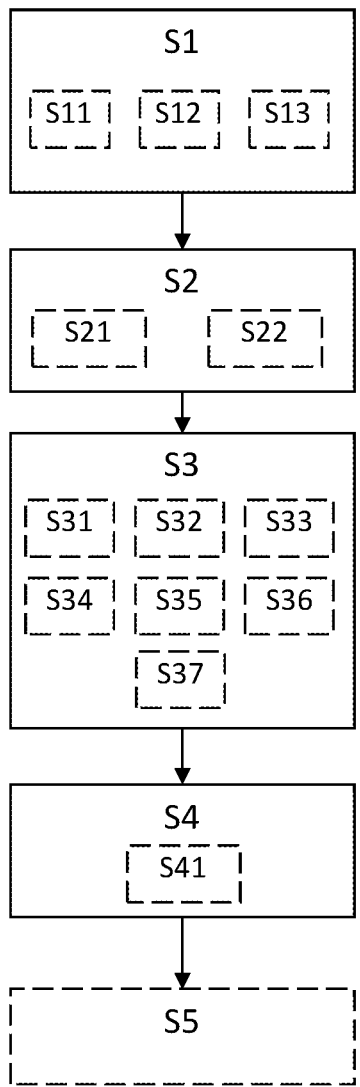
FIG. 6 is a flow chart illustrating methods.

To summarize, with reference to the flow chart in FIG. 6, there is disclosed herein a computer implemented method for controlling at least one wheel 102 of a heavy-duty vehicle 100. The wheel 102 may be a driven wheel and/or a braked wheel, although the technique is perhaps most advantageously used for propulsion. The slip control methods disclosed herein are particularly suitable for implementation with wheel end electrical machines but may also be used with differential drive arrangements powered by a combustion engine, a hybrid electric machine, or an electric machine. The method comprises obtaining S1 a motion request $a_{req}$ indicative of a desired longitudinal acceleration and/or longitudinal force $F_x$ associated with the vehicle 100. The motion request $a_{req}$ may, as discussed above, be obtained as function of an accelerator pedal position or brake pedal position S11, from an MSD coordination function 530 of a VMM system comprised in the vehicle 100 S12, as discussed above in connection to FIG. 5, or from an autonomous or semi-autonomous drive function comprised in the vehicle 100. Thus, the step of obtaining S1 the motion request $a_{req}$ indicative of the desired longitudinal acceleration by the vehicle 100 is to be interpreted broadly herein.

The functions discussed herein may be configured or parameterized in dependence of application and/or vehicle type. It is appreciated that the driver control interface may differ between different vehicles, such variations of course need to be accounted for.

The method also comprises configuring S2 a wheel slip limit value $\lambda_{lim}$ at a nominal wheel slip limit value. This wheel slip limit value $\lambda_{lim}$ is indicative of a maximum allowable wheel slip by the at least one driven and/or braked wheel 102. This essentially means that wheel speed will be limited by the system such that the resulting wheel slip does not exceed the wheel slip limit. Equivalently, the wheel speed in relation to the vehicle speed may be limited such that the wheel slip does not exceed the wheel slip limit. The nominal wheel slip limit value may simply be predetermined, i.e., hardcoded at assembly. However, some aspects of the method also comprise determining S22 the nominal wheel slip limit value based on an inverse tyre model, wherein the inverse tyre model is representative of a relationship between wheel slip) $\lambda$ and wheel force $F_x$ of the at least one driven and/or braked wheel 102. An example of this inverse tyre model was discussed above, e.g., in connection to FIG. 2. An inverse tyre model may be used to configure a wheel slip limit value, e.g., by selecting the wheel slip which corresponds to, e.g., 0.9 of the peak wheel force. This provides some margin with respect to the non-linear region, which is often undesired to operate in. The inverse tyre model may either be fixed or dynamically updated based on measured vehicle behavior at different wheel slip values.

Since the nominal wheel slip limit value may be too small in some cases, for instance due to an erroneous inverse tyre model, errors in estimated road friction conditions, incorrect tyre models, and the like, the method comprises increasing S3 a magnitude of the configured wheel slip limit value $\lambda_{lim}$ from the nominal wheel slip limit value to a boost wheel slip limit value in response to detecting a boost signal 361. As noted above, this may mean increasing a positive wheel slip value (propulsion wheel slip limit) and/or decreasing a negative wheel slip value (brake wheel slip limit).

The generation of the boost signal may be based on one or more triggers, and potentially also conditioned on one or more parameters. A trigger is some form of event which causes generation of the boost signal, but only if all the configured conditions are met. For instance, the boost signal S32 generation optionally comprises an accelerator pedal position exceeding a threshold value. Thus, if a driver presses the pedal down enough, such as beyond 80% of the full pedal range, the boost signal is generated if all the configured conditions are also met. The boost signal may also be configured to be generated by a mechanical or electrical switch when the accelerator or brake pedal is depressed fully. According to further aspects, the boost signal is triggered S38 by an accelerator pedal position or brake pedal position exceeding the threshold value for a pre-determined time period. In this case the driver needs to depress the pedal for a certain amount of time before the boost functions discussed herein are triggered.

The boost signal S33 may also be configured to be triggered by operation of a manual trigger device. This manual trigger device may, e.g., be an in-cabin button or a menu selection option on a control system of the vehicle. Thus, a driver desiring to obtain additional wheel slip beyond the configured nominal wheel slip limit may activate the manual trigger device in order to shift the wheel slip limit to a higher magnitude value.

The boost signal S39 may of course also be arranged to be remotely triggered by operation of a remote-control trigger device. For instance, a remote-control tower or the like may comprise a remote-control system which implements a function to remotely activate the boost function and increase the magnitude of the configured wheel slip limit value from the nominal wheel slip limit value to a boost wheel slip limit value. The remote-control trigger device then implements a function which permits a given vehicle to operate at a higher wheel slip limit compared to a nominal configuration, which may be desired in some scenarios. For instance, operating at a higher wheel slip may be deemed safe if no other vehicles are nearby, and it is determined that an extra increase in wheel slip would be beneficial from a vehicle motion management performance perspective.

The boost signal S34 may be conditioned on that the vehicle 100 is operating at a velocity below a vehicle velocity acceptance threshold. This means that no increase in wheel slip limit magnitude will be allowed to occur if the vehicle is moving too fast, which could otherwise increase the risk of the vehicle ending up in an unstable or otherwise undesired state. The boost signal generation S35 may furthermore be conditioned on that the vehicle 100 is operating at a yaw motion below a vehicle yaw motion acceptance threshold. Thus, no increase of wheel slip limit will be permitted if the vehicle is turning too much, i.e., following a path of too large curvature. It is appreciated that the condition on yaw motion may be disregarded if the vehicle is moving very slowly. Hence, in case the vehicle 100 is operating at a velocity below a vehicle velocity acceptance threshold, more yaw motion may be permitted compared to if the vehicle is moving faster.

The method may furthermore comprise determining S36 a lateral force requirement of the at least driven and/or braked wheel 102. Generation of the boost signal may then be conditioned on that the lateral force requirement is below a lateral force requirement threshold. The rationale for this being that only very little lateral force is possible to generate if the wheel is operating at too large longitudinal wheel slip. Hence, if there are lateral forces to be generated, it may be unwise to allow an increase of wheel slip to levels where such lateral forces cannot be generated. It is, however, appreciated that the condition on low velocity may take precedence over the condition on lateral force requirement.

The method may further comprise increasing S37 the configured wheel slip limit value $\lambda_{lim}$ from the nominal wheel slip limit value to the boost wheel slip limit value only during a pre-determined time period. This means that the increase in wheel slip limit value up to the boost level is only temporary, in order to prevent, e.g., the vehicle digging into the road surface and getting stuck. The pre-determined time period may be set at, e.g., between 1 and 5 seconds or so. Another time period of increased wheel slip may be permitted after a resting period of, say a few seconds or so. The method also comprises controlling S4 the at least one driven and/or braked wheel 102 in dependence of the motion request $a_{req}$ and subject to the configured wheel slip limit value $\lambda_{lim}$. Methods for controlling a driven and or a braked wheel in dependence of the motion request $a_{req}$ and subject to the configured wheel slip limit value $\lambda_{lim}$ are known in the art and will therefore not be discussed in more detail herein. Some example methods were provided above in connection to FIG. 5.

The methods disclosed herein optionally also comprises determining S21 the target wheel slip value $\lambda$ as a nominal target wheel slip value in dependence of the motion request $a_{req}$ and in dependence of an inverse tyre model 200 representing a relationship between wheel slip $\lambda$ and longitudinal wheel force $F_x$, increasing S31 the target wheel slip value $\lambda$ from the nominal target wheel slip value to a boost wheel slip value in response to detecting the boost signal 361, and controlling S41 the at least one driven and/or braked wheel 102 in dependence of the target wheel slip value $\lambda$.

According to further aspects, the method also comprises updating S5 an inverse tyre model associated with the at least one driven and/or braked wheel 102 in response to detecting the boost signal 361. These aspects become relevant when the inverse tyre model is adjusted continuously or periodically based, e.g., on an estimated longitudinal wheel force. In this case the VMM system may keep a record of wheel slips and corresponding estimated or measured wheel force values. For instance, some electric machines provide an output signal indicative of an applied torque in real time, which can be translated into wheel force. However, the inverse tyre model will be inaccurate for large slip values above the configured wheel slip limit, since such values never occur, unless the boost mode is used to allow them temporarily.

The object may also be obtained by a computer implemented method for controlling at least one driven and/or braked wheel of a heavy-duty vehicle. The method comprises obtaining a motion request indicative of a desired longitudinal force to be generated by one or more wheels on the vehicle, configuring a nominal relationship (such as an inverse tyre model) between wheel slip and longitudinal force at least partly based on a slip stiffness value, obtaining a driver input signal indicative of a desired adjustment of the nominal slip stiffness value, reconfiguring the nominal relationship between wheel slip and longitudinal force to account for the desired adjustment in slip stiffness value, and controlling the at least one driven and/or braked wheel in dependence of the motion request and based on the adjusted relationship between wheel slip and longitudinal force.

Thus, the driver input signal, which may be the boost signal discussed above, is used to adjust the properties of the perceived vehicle dynamics. An effect similar to the boost mode discussed above may be obtained in this manner, by adjusting the relationship between wheel slip and longitudinal force. This type of inverse tyre model parameterization may of course also be used to adjust the assumed peak force point of the relationship between tyre force and wheel slip, which then of course has an effect on the wheel slip limit value, if this wheel slip limit value is configured in dependence of the peak location, as discussed in connection to FIG. 2 above.

Figure 7:
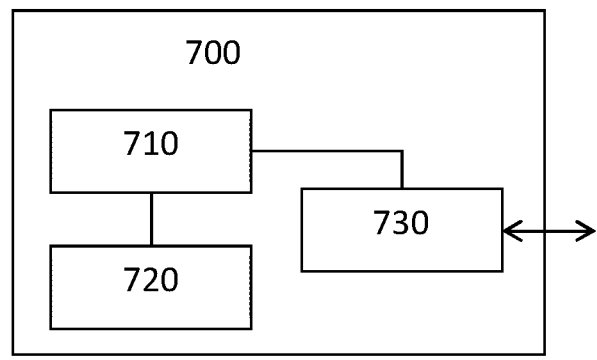
FIG. 7 schematically illustrates a control unit.
Figure 8:
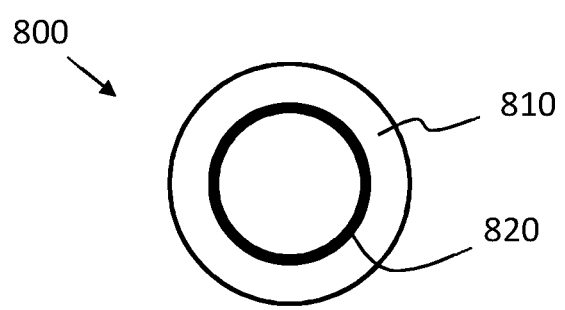
FIG. 8 shows an example computer program product.

FIG. 7 schematically illustrates, in terms of a number of functional units, the components of a control unit 700 according to embodiments of the discussions herein, such as any of the MSD control system 330 or the VMM system 360. Processing circuitry 710 is provided using any combination of one or more of a suitable central processing unit CPU, multiprocessor, microcontroller, digital signal processor DSP, etc., capable of executing software instructions stored in a computer program product, e.g., in the form of a storage medium 730. The processing circuitry 710 may further be provided as at least one application specific integrated circuit ASIC, or field programmable gate array FPGA. Particularly, the processing circuitry 710 is configured to cause the control unit 700 to perform a set of operations, or steps, such as the methods discussed in connection to FIG. 9 and generally herein. For example, the storage medium 730 may store the set of operations, and the processing circuitry 710 may be configured to retrieve the set of operations from the storage medium 730 to cause the control unit 700 to perform the set of operations. The set of operations may be provided as a set of executable instructions. Thus, the processing circuitry 710 is thereby arranged to execute methods as herein disclosed. In particular, the processing circuitry 710 arranged to obtain a motion request $a_{req}$ indicative of a desired longitudinal acceleration by the vehicle 100 or a desired longitudinal force to be generated, and configure a wheel slip limit value $\lambda_{lim}$ indicative of a maximum allowable wheel slip by the at least one driven and/or braked wheel 102 at a nominal wheel slip limit value, and also increase the configured wheel slip limit value $\lambda_{lim}$ from the nominal wheel slip limit value to a boost wheel slip limit value in response to detecting a boost signal 361, and to control the at least one driven and/or braked wheel 102 in dependence of the motion request $a_{req}$ and subject to the configured wheel slip limit value $\lambda_{lim}$.

The storage medium 730 may also comprise persistent storage, which, for example, can be any single one or combination of magnetic memory, optical memory, solid state memory or even remotely mounted memory.

The control unit 700 may further comprise an interface 720 for communications with at least one external device. As such the interface 720 may comprise one or more transmitters and receivers, comprising analogue and digital components and a suitable number of ports for wireline or wireless communication.

The processing circuitry 710 controls the general operation of the control unit 700, e.g., by sending data and control signals to the interface 720 and the storage medium 730, by receiving data and reports from the interface 720, and by retrieving data and instructions from the storage medium 730. Other components, as well as the related functionality, of the control node are omitted in order not to obscure the concepts presented herein.

FIG. 11 illustrates a computer readable medium 810 carrying a computer program comprising program code means 820 for performing the methods illustrated in FIG. 6 and the techniques discussed herein, when said program product is run on a computer. The computer readable medium and the code means may together form a computer program product 800.

The invention claimed is:

1. A computer implemented method for controlling at least one driven and/or braked wheel of a heavy-duty vehicle, the method comprising:

obtaining a motion request indicative of a desired longitudinal acceleration and/or a desired longitudinal force associated with the heavy-duty vehicle;

configuring a wheel slip limit value at a nominal wheel slip limit value in dependence of an inverse tyre model, wherein the inverse tyre model represents a first relationship between wheel slip and wheel force at the wheel with a peak corresponding to maximum longitudinal force at an associated wheel slip value, wherein the wheel slip limit value is indicative of a maximum allowable wheel slip by the at least one driven and/or braked wheel, and wherein the nominal wheel slip limit value is determined with a margin to the peak of the inverse tyre model; and increasing a magnitude of the configured wheel slip limit value from the nominal wheel slip limit value to a boost wheel slip limit value in response to detecting a boost signal, thereby enabling operation in a non-linear region of the inverse tyre model and beyond the peak of the inverse tyre model, the method also comprising controlling the at least one driven and/or braked wheel in dependence of the motion request and subject to the configured wheel slip limit value,
wherein said boost wheel slip limit value is greater than the nominal wheel slip limit value, and
wherein said boost signal is generated in response to a determination that a wheel slip limit value beyond the nominal wheel slip limit value is desired.

2. The method according to claim 1, further comprising determining a target wheel slip value as a nominal target wheel slip value in dependence of the motion request and in dependence of the inverse tyre model, the inverse tyre model representing a relationship between wheel slip and longitudinal wheel force, increasing the target wheel slip value from the nominal target wheel slip value to a boost target wheel slip value in response to detecting the boost signal, and controlling the at least one driven and/or braked wheel in dependence of the target wheel slip value.

3. The method according to claim 1, comprising obtaining the motion request as function of an accelerator pedal position or a brake pedal position.

4. The method according to claim 1, comprising obtaining the motion request from a motion support device, MSD, coordination function of a vehicle motion management, VMM, system comprised in the heavy-duty vehicle.

5. The method according to claim 1, comprising obtaining the motion request from an autonomous or semi-autonomous drive function comprised in the heavy-duty vehicle.

6. The method according to claim 1, comprising determining the nominal wheel slip limit value based on the inverse tyre model, wherein the inverse tyre model is further representative of a second relationship between wheel slip and wheel force of the at least one driven and/or braked wheel.

7. The method according to claim 1, wherein the boost signal is triggered by an accelerator pedal position or brake pedal position exceeding a threshold value.

8. The method according to claim 1, wherein the boost signal is arranged to be manually triggered by operation of a trigger device.

9. The method according to claim 1, wherein the boost signal is conditioned on that the heavy-duty vehicle is operating at a velocity below a vehicle velocity acceptance threshold.

10. The method according to claim 1, wherein the boost signal is conditioned on that the heavy-duty vehicle is operating at a yaw motion below a vehicle yaw motion acceptance threshold.

11. The method according to claim 1, comprising determining a lateral force requirement of the at least driven and/or braked wheel, wherein the boost signal is conditioned on that the lateral force requirement is below a lateral force requirement threshold.

12. The method according to claim 1, comprising increasing the configured wheel slip limit value from the nominal wheel slip limit value to the boost wheel slip limit value only during a pre-determined time period.

13. The method according to claim 1, wherein the boost signal is triggered by an accelerator pedal position or brake pedal position exceeding a threshold value for a pre-determined time period.

14. The method according to claim 1, wherein the boost signal is arranged to be remotely triggered by operation of a remote-control trigger device.

15. The method according to claim 1, comprising updating the inverse tyre model associated with the at least one driven and/or braked wheel in response to detecting the boost signal.

16. A non-transitory computer-readable medium storing a computer program for performing the method of claim 1 when the computer program is executed on a computer.

17. A control unit for controlling at least one driven and/or braked wheel of a heavy-duty vehicle, the control unit comprising processing circuitry arranged to
obtain a motion request indicative of a desired longitudinal acceleration and/or a desired longitudinal force associated with the heavy-duty vehicle, and
configure a wheel slip limit value indicative of a maximum allowable wheel slip by the at least one driven and/or braked wheel at a nominal wheel slip limit value, and also increase the configured wheel slip limit value from the nominal wheel slip limit value to a boost wheel slip limit value in response to detecting a boost signal, thereby enabling operation in a non-linear region of the inverse tyre model and beyond the peak of the inverse tyre model and to control the at least one driven and/or braked wheel in dependence of the motion request and subject to the configured wheel slip limit value.

18. A heavy-duty vehicle comprising:
a control unit for controlling at least one driven and/or braked wheel of a heavy-duty vehicle, the control unit comprising processing circuitry arranged to
obtain a motion request indicative of a desired longitudinal acceleration and/or a desired longitudinal force associated with the heavy-duty vehicle, and
configure a wheel slip limit value indicative of a maximum allowable wheel slip by the at least one driven and/or braked wheel at a nominal wheel slip limit value, and also increase the configured wheel slip limit value from the nominal wheel slip limit value to a boost wheel slip limit value in response to detecting a boost signal, thereby enabling operation in a non-linear region of the inverse tyre model and beyond the peak of the inverse tyre model and to control the at least one driven and/or braked wheel in dependence of the motion request and subject to the configured wheel slip limit value.

* * * * *